Inventors:
Pranjivan V. Popat,
Edward J. Rubin,
Victor J. Schneider, III
by James P. McAndrews
Att'y.

United States Patent Office 3,489,664
Patented Jan. 13, 1970

3,489,664
MANUFACTURE OF ELECTROCHEMICALLY ACTIVE β-NICKELIC HYDROXIDE
Pranjivan V. Popat, Attleboro, Edward J. Rubin, Sharon, and Victor J. Schneider III, Norton, Mass., assignors to Texas Instruments Incorporated, Dallas, Tex., a corporation of Delaware
Filed Feb. 28, 1967, Ser. No. 619,449
Int. Cl. B01k 1/00; C01b 13/14
U.S. Cl. 204—96                        9 Claims

ABSTRACT OF THE DISCLOSURE

Electrochemically active β-nickelic hydroxide in particulate form for use in battery electrodes is made by combining gross quantities of a basic solution and an aqueous solution of nickel sulfate or other nickel salt and mechanically mixing the combined solution to precipitate flocculent, green nickelous hydroxide, by propelling the precipitate against an outer surface of an anode for oxidizing the precipitate and accumulating the oxidized precipitate separately from the solution to form the desired, particulate, β-nickelic hydroxide.

BACKGROUND OF THE INVENTION

At the present time, positive electrodes for nickel-cadmium batteries incorporate porous electrically-conductive substrates comprising nickel metal dust sintered to a wire mesh nickel screen. This porous substrate is conventionally impregnated with a solution of nickel nitrate and is immersed in a potassium hydroxide solution together with a suitable counter electrode so that the hydroxide solution slowly diffuses into the substrate pores for precipitating nickelous hydroxide in the pores. Electrical current is then passed through the solution for converting the precipitate into electrochemically active β-nickelic hydroxide in situ so that the active material is trapped within the porous nickel substrate. In this process, the basic nickel nitrate solution must be repeatedly replenished—by removing the substrate from the hydroxide solution and reimpregnating the substrate—in order to deposit sufficient electrochemically active material in the substrate. In many such processes the impregnated substrate must be removed from the hydroxide solution and reimpregnated with the nickel nitrate solution as many as ten times per order to deposit sufficient electrochemically active material in the substrate. This means that impregnating the substrate requires the use of considerable effort and a great number of process steps. In addition, the hydroxide and nickel nitrate solutions meet only at small interfaces at the ends of the substrate pores so that the solutions are mixed only by diffusion. As a result, the process frequently requires as much as 16 hours for deposition of sufficient active material to form a suitable electrode.

It has been proposed to form porous battery electrodes by securing electrochemically active, particulate materials to an electrically-conductive metallic substrate by means of a plastic binder material. Such a process has proved highly advantageous in permitting the rapid and inexpensive manufacture of electrodes of remarkable uniformity. If such a process could be employed for making positive nickel electrodes, such electrodes could be made at substantially lower cost than the above-described impregnated electrodes now used in the art. However, as electrochemically active β-nickelic hydroxide has not been available in particulate form, the described binder process for making battery electrodes has been restricted to the formation of negative electrodes for nickel-cadmium battery systems and the like.

SUMMARY OF THE INVENTION

It is an object of this invention to make β-nickelic hydroxide in particulate form by an inexpensive process for use in making electrodes by the above-described binder process. In accordance with this invention, electrochemically active β-nickelic hydroxide is made in particulate form by combining gross quantities of a basic solution and an aqueous solution of nickel sulfate or other conveniently available nickel salt and mechanically mixing the combined solution to rapidly precipitate flocculent, green nickelous hydroxide. This precipitate is then propelled against an outer surface of an anode where the precipitate is oxidized in the solution. The oxidized precipitate is then separated from the solution and accumulated to form the desired β-nickelic hydroxide in particulate form. The electrochemically active material is easily separated from the solution, is preferably washed briefly to remove contaminants, and is easily dried. The dried β-nickelic hydroxide in particulate form is ready for use in forming positive battery electrodes for nickel-cadmium batteries and the like by use of the binder process described above.

DESCRIPTION OF THE PREFERRED EMBODIMENTS

Positive electrodes in nickel-cadmium batteries incorporate an electrochemically active material which embodies nickel and oxygen. It is clear that the proportion of oxygen to nickel in the material increases during charging of the electrode and decreases during discharging of the electrode. However, various conventions are employed in referring to the active material in its states of charge and discharge. For example, in one convention the material is referred to as nickel peroxide [$NiO_2$] in its charged state and as nickel oxide [$NiO$] in its discharged state; in another convention, the material is referred to as nickelic hydroxide [$Ni(OH)_3$] in its charged state and as nickelous hydroxide ($Ni(OH)_2$) in its discharged state; in still another convention, the active material is referred to as β-nickelic hydroxide [β-$NiOOH$] in its charged state and as hydrated nickelous oxide [$NiO \cdot xH_2O$] or nickelous hydroxide [$Ni(OH)_2$] in its discharged state. This latter convention is followed herein and it will be understood that the term β-nickelic hydroxide refers to electrochemically active nickel material in its charged state.

In the preferred process of this invention for making β-nickelic hydroxide in particulate form, hydrated nickel sulfate [$NiSO_{4.6}H_2O$] or other commercially available nickel salt, for example nickel nitrate, nickel acetate, nickel chloride, nickel carbonate, nickel formate or the like, is dissolved in deionized water to form a saturated solution at room temperature. For example, about 600 grams of nickel sulfate is dissolved in a liter of deionized water. If desired, the solution is heated to increase the solubility of the salt therein.

Figure 1:
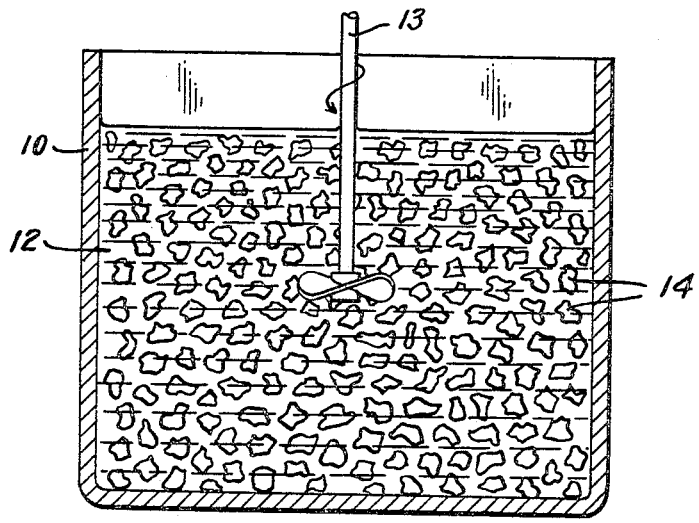
FIG. 1 is a diagrammatic view illustrating part of the process of this invention.

A basic solution such as an aqueous solution of potassium or sodium hydroxide or the like is then prepared, a gross quantity of this basic solution is then combined with a gross quantity of the nickel sulfate solution in a smooth surfaced, electrically-conductive, stainless steel container 10, and the combined solution 12 is mechanically mixed as indicated by agitating means 13 in FIG. 1. The combined solution 12 in sufficiently basic to precipitate flocculent, green nickelous hydroxide

[Ni(OH)$_2$] from the solution as indicated at 14 in FIG. 1. As will be understood, sufficient basic solution is employed to assure formation of the maximum amount of nickelous hydroxide from the combined solution. For example, at least about ½ liter of a 30% aqueous solution of potassium hydroxide is preferably combined with the liter of saturated sulfate solution previously described.

The nickelous hydroxide precipitate as formed at this state in the present process is not suitable for use in making battery electrodes by use of the binder process previously described. That is, the flocculent precipitate is too soft and cannot be properly bonded to a substrate unless thoroughly dried. However it has been found that, when thoroughly dried, the material displays relatively low or inadequate electrochemical activity characteristics.

Figure 2:
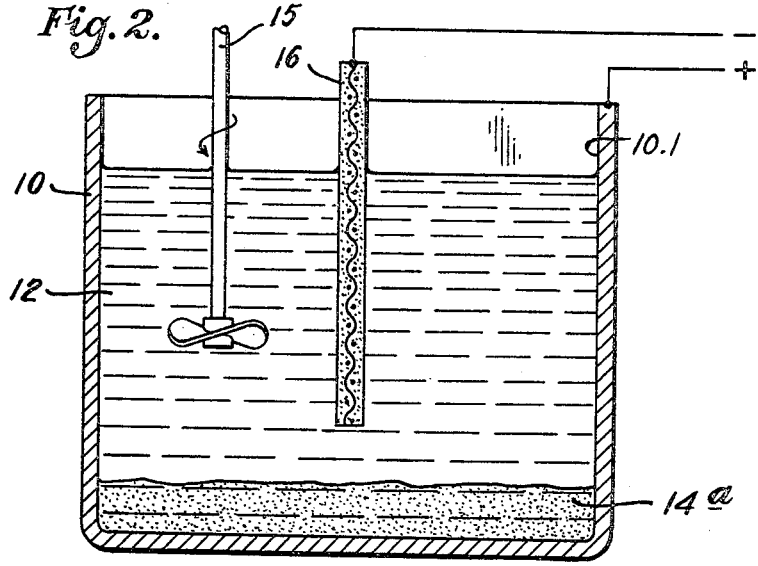
FIG. 2 is a diagrammatic view illustrating a subsequent part of the process of FIG. 1.

In accordance with this invention, an electrically conductive nickel screen or plate 16 of suitable size is then suspended in the solution 12 and is electrically insulated from the container 10 in any conventional manner. The nickel screen and the container are connected in an electrical circuit as electrodes of opposite polarity as indicated in FIG. 2, the screen being connected as the cathode and the container as the anode, for passing direct electrical current through the solution 12. At the same time, the solution 12 is mixed or agitated as indicated by the agitating means 15 in FIG. 2 for moving or propelling the precipitate 14 against an outer surface 10.1 of the anode container 10. In this way, the flocculent, green precipitate, nickelous hydroxide, immediately begins to turn black as the nickelous hydroxide is electrochemically oxidized in the solution to form β-nickelic hydroxide. As the precipitate is oxidized as it is brought against an outer surface of the anode container, the oxidized precipitate remains in the solution and gradually settles to the bottom of the container 10 as indicated at 14a in FIG. 2. In this process, the density of the precipitate is increased and the precipitate becomes significantly harder acquiring a substantially more definite particle shape. Current flow is then continued through the solution 12 until all of the precipitate has turned black. For example, where the combined solution 12 embodies quantities of the nickel sulfate and potassium hydroxide solutions as above described, direct current is passed through the combined solution at a rate of 10 amperes per hour for 10 hours in a single process step for oxidizing the precipitate formed in the solution. It should be understood that the member 16 may be connected as the anode within the scope of this invention, the generally cylindrical container 10 being preferably used as the anode because of its greater surface area.

After the flow of current through the solution is discontinued, the active β-nickelic hydroxide is separated from the solution 12 and accumulated by filtering or in other conventional manner. The accumulated precipitate is preferably rinsed once or twice with water to remove contaminants. The active material is then thoroughly dried, preferably at room temperature. As the particulate material does not adhere to the smooth surfaced stainless steel container to any substantial extent, the material is easily separated from the solution by simply decanting the solution and the moist active material into suitable conventional filter means. If desired, the resulting dried material is pulverized by any conventional means for reducing the size of the material particles. However, for general use in battery electrodes the particles are of about 10 micron size or less so that further reduction of particle size is not usually required. At least about 110 grams of β-nickelic hydroxide in particulate form are derived from the quantities of nickel sulfate and potassium hydroxide solutions above described.

It should be noted that nickel sulfate is the preferred nickel salt for use in the process of this invention, the use of nickel sulfate resulting in production of active β-nickelic hydroxide of high purity without the presence of significant contaminants such as nitrate ions which adversely effect use of the active material in battery electrodes. In this regard, it has been noted that the presence of nitrate ions in the active nickel material results in lower electrode efficiency, the nitrate ion tending to be alternately reduced to nitrite ion and reoxidized to nitrate ion and to shuttle between the positive and negative electrodes in a battery system and therefor reduces the state of charge of the electrodes.

The electrochemically active, particulate β-nickelic hydroxide formed in the process of this invention is adapted to be combined with an equal quantity by weight of nickel dust and with a plastic binder for securing the β-nickelic hydroxide to a metallic screen substrate to form a porous, charged positive battery electrode in the manner described in the copending application entitled "Battery Electrode and Method of Making," filed on or about Mar. 1, 1967, by P. V. Popat and K. Johnson and now owned by the assignee of the present application. While such an electrode is employed as a positive electrode in a battery system using a suitable counter electrode, the positive electrode displays energy capacity and operating characteristics comparable to conventional sintered nickel electrodes. However, the electrode is significantly more flexible than the conventional sintered nickel electrode, a factor which facilitates use of the electrode in "jelly-roll" electrode configurations conventionally used in small nickel-cadmium batteries and the like. Use of the particulate β-nickelic hydroxide provided by this invention also permits much less expensive manufacture of electrodes in continuous processes. That is, the use of particulate β-nickelic hydroxide of this invention in forming electrodes so facilitates electrode manufacture that the electrodes can be made with significantly lower cost and improved energy density in terms of either watthours per unit weight or watt-hours per unit volume.

Although particular embodiments of the process of this invention have been described by way of illustration, this invention includes all modifications and equivalents thereof which fall within the scope of the appended claims.

We claim:
1. A process for making electrochemically active β-nickelic hydroxide in particulate form comprising the steps of combining and mechanically mixing gross quantities of a basic solution and a solution of a nickel salt to precipitate nickelous hydroxide, electrochemically oxidizing the precipitate within the combined solution, and accumulating the oxidized precipitate as a separate material free from the combined solution to form electrochemically active β-nickelic hydroxide in particulate form.

2. A process for making electrochemically active β-nickelic hydroxide in particulate form comprising the steps of combining gross quantities of a basic solution and a solution of a nickel salt to precipitate nickelous hydroxide, mechanically mixing the combined solution for moving the precipitate within the combined solution against an outer surface of an anode to electrochemically oxidize the precipitate within the solution, and accumulating the oxidized precipitate as a separate material free from the combined solution to form electrochemically active β-nickelic hydroxide in particular form.

3. A process as set forth in claim 2 wherein said nickel salt is selected from the group consisting of nickel sulfate, nickel nitrate, nickel acetate, nickel chloride, nickel carbonate, and nickel formate.

4. A process as set forth in claim 3 wherein said basic solution is selected from the group consisting of aqueous solutions of potassium hydroxide and sodium hydroxide.

5. A process as set forth in claim 3 wherein said anode comprises a generally cylindrical smooth surfaced container for said solutions.

6. A process as set forth in claim 2 wherein said nickelous hydroxide precipitate is propelled against said outer anode surface for oxidizing the precipitate.

7. A process for making electrochemically active β-nickelic hydroxide in particulate form comprising the steps of combining and mechanically mixing gross quantities of a potassium hydroxide solution and a nickel sulfate solution to precipitate nickelous hydroxide, mechanically mixing the combined solution by propelling said precipitate within the solution against an outer surface of an anode for electrochemically oxidizing said precipitate within said solution, separating said oxidized precipitate as a separate material free from said solution, and drying said oxidized precipitate to form β-nickelic hydroxide in particulate form.

8. A process for making electrochemically active β-nickelic hydroxide in particulate form comprising the steps of combining and mechanically mixing gross quantities of a basic solution and a nickel sulfate solution in an electrically conductive container to precipitate nickelous hydroxide, introducing an electrically conductive member to said solution in electrically insulated relation to said container, electrically connecting said container and member as electrodes of opposite polarity, mechanically mixing said combined solution for moving said precipitate against an outer surface of one of said electrodes to electrochemically oxidize said precipitate within said solution, separating and accumulating said oxidized precipitate as a separate material free from said solution, and drying said oxidized precipitate to form β-nickelic hydroxide in particulate form.

9. A process as set forth in claim 8 wherein said container is electrically connected as an anode and said precipitate is moved against said anode to be oxidized within said solution.

References Cited

UNITED STATES PATENTS

| | | | |
|---|---|---|---|
| 2,162,385 | 6/1939 | Langguth | 204—1 |
| 3,347,706 | 10/1967 | Krivanek et al. | 136—28 |

FOREIGN PATENTS

| | | |
|---|---|---|
| 932,934 | 7/1963 | Great Britain. |
| 1,050,876 | 12/1966 | Great Britain. |

OTHER REFERENCES

Tuomi, Donald: The Forming Process in Nickel Positive Electrodes, Journal Electrochemical Society, vol. 112, January 1965, pp. 1 to 12.

JOHN H. MACK, Primary Examiner

H. M. FLOURNOY, Assistant Examiner